(12) United States Patent
Carlson

(10) Patent No.: US 6,273,293 B1
(45) Date of Patent: Aug. 14, 2001

(54) COMBINED FILTER HOUSING EXTRACTOR AND INSERTER

(76) Inventor: Ronald B. Carlson, 508 E. Wabash Ave., Spokane, WA (US) 99207

( * ) Notice: Subject to any disclaimer, the term of this patent is extended or adjusted under 35 U.S.C. 154(b) by 0 days.

(21) Appl. No.: 09/594,446

(22) Filed: Jun. 15, 2000

Related U.S. Application Data

(60) Provisional application No. 60/141,653, filed on Jun. 26, 1999.

(51) Int. Cl.[7] ....................................................... B65H 3/20
(52) U.S. Cl. ............................ 221/37; 221/210; 221/259; 294/1.1
(58) Field of Search ..................................... 294/1.1, 64.1, 294/65.5; 206/499; 221/36, 37, 45, 210, 213, 214, 255, 259, 261

(56) References Cited

U.S. PATENT DOCUMENTS

| | | |
|---|---|---|
| 4,214,673 | 7/1980 | Heath . |
| 4,676,396 * | 6/1987 | Mamolou ........................... 294/1.1 X |
| 4,848,815 | 7/1989 | Molloy . |
| 4,905,870 | 3/1990 | Mamolou . |
| 5,067,627 * | 11/1991 | Anderson ........................ 221/210 X |
| 5,097,984 | 3/1992 | Meisner . |
| 6,116,459 * | 9/2000 | Wilson ............................. 221/259 X |

\* cited by examiner

*Primary Examiner*—Johnny D. Cherry

(57) ABSTRACT

A completely enclosed coffee filter housing capable of storing a plurality of filters therein, a cover with an adhesive tipped rod, centrally located, extending below the underside of the cover to engage an individual filter when the cover is depressed, and extract the filter when the cover is removed. A plunger extends above and below the cover, the lower end arranged around the adhesive tipped rod and the upper end terminated with a cap. When the plunger is depressed, the individual filter is detached from the rod and inserted into a coffee maker receptacle.

5 Claims, 1 Drawing Sheet

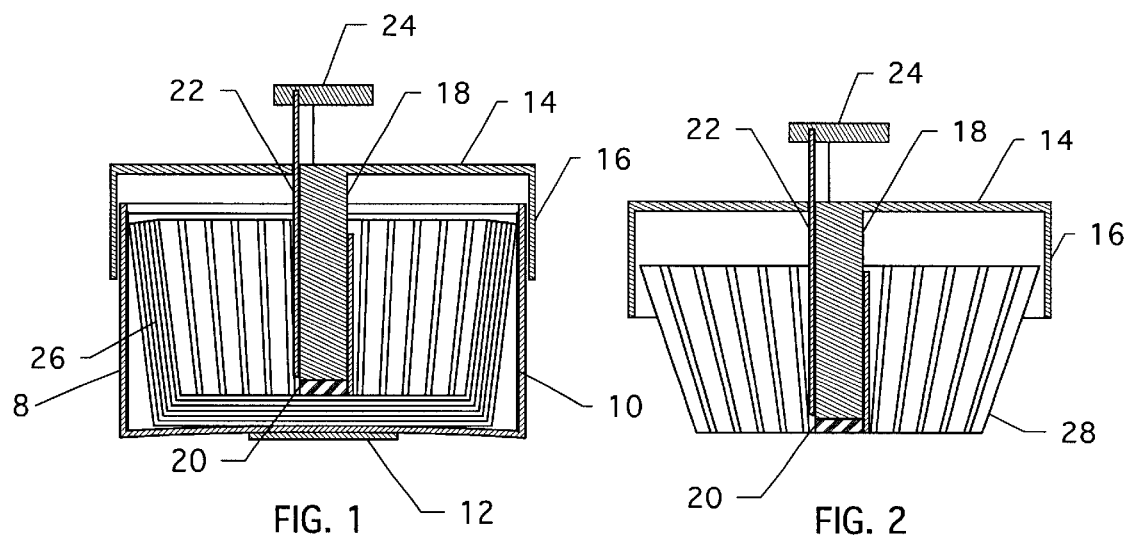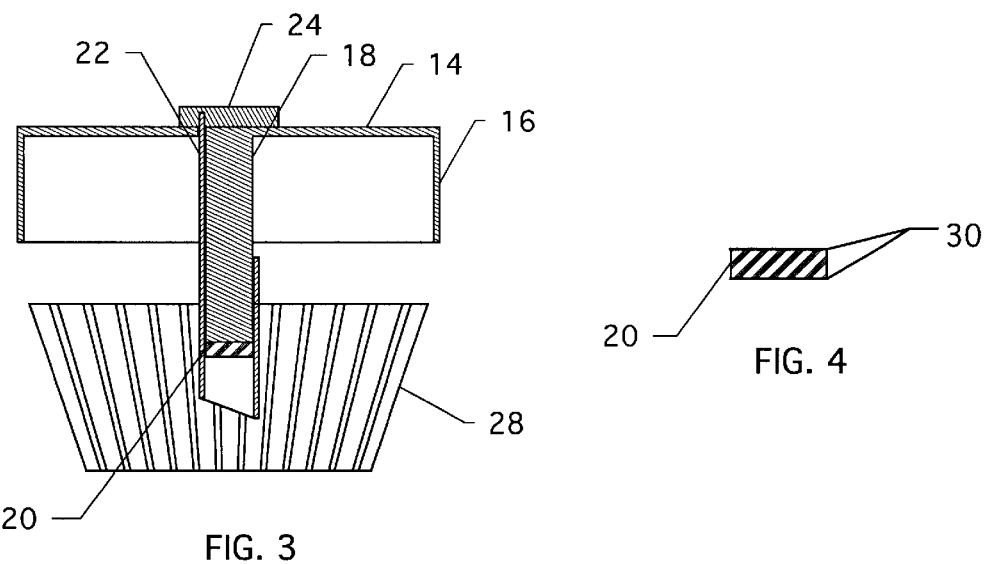

COMBINED FILTER HOUSING EXTRACTOR AND INSERTER

CROSS-REFERENCE TO RELATED APPLICATIONS

This application is entitled to the benefit of Provisional Patent Application Ser. No. 60/141,653, filed Jun. 26, 1999.

STATEMENT REGARDING FEDERALLY SPONSORED RESEARCH OR DEVELOPMENT

Not applicable.

BACKGROUND OF THE INVENTION

1. Field of the Invention

The present invention relates to cup shaped coffee filter housings, and more particularly to a combined filter housing, extractor and inserter.

2. Discussion of the Relevant Art

The applicant is aware of several devices that are designed to store and dispense cup shaped coffee filters.

In U.S. Pat. No. 4,214,673 (Heath) there is disclosed a filter housing and extractor using an abrasive tipped arm to slide individual filters out of a housing.

In U.S. Pat. No. 4,676,396 (Mamalou) there is disclosed a filter housing with a cover assembly using tongs to remove individual filters.

In U.S. Pat. No. 4,848,815 (Molloy) there is disclosed an adhesive tipped device for separating an individual filter from a stack of filters.

In U.S. Pat. No. 4,905,870 (Mamalou) there is disclosed a filter housing with a cover assembly using an inverted V-shaped pincer to remove individual filters.

In U.S. Pat. No. 4,957,217 (Ritson) there is disclosed a filter housing with a cover assembly using an adhesive tipped rod to remove individual filters.

In U.S. Pat. No. 5,097,984 (Meisner) there is disclosed a filter housing using an adhesive tipped plunger assembly to remove individual filters.

While the devices disclosed in the foregoing patents will remove individual filters from a plurality of nested filters, they leave much to be desired for various reasons. For example, after the individual filters have been removed from the nested stack of filters in the foregoing patents, they have to be inserted into a coffee maker receptacle by hand.

The devices of Mamalou are difficult to operate, requiring strong fingers and are subject to flexing fatigue in the gripping mechanism. They are not suitable for vertical mounting.

The device of Ritson requires a rotating motion of the cover to free and extract an individual filter and has no means of retaining a plurality of filters when this is done. It can not be mounted vertically.

The device of Ritson has a cover that does not protect the filters from outside contamination.

The devices of Meisner and Heath are extremely complicated and difficult to manufacture.

The device of Molloy does not provide for a covered housing for the filters.

OBJECT OF THE INVENTION

It is the general object of the instant invention to provide a coffee filter housing, extracting and inserting device that overcomes the shortcomings of the prior art.

It is a further object of the instant invention to provide a device that is compact and easy to manufacture.

It is another object of the instant invention to provide a device that can be mounted horizontally or vertically.

It is another object of the instant invention to provide a coffee filter housing, extracting and inserting device capable of extracting an individual filter from a plurality of nested filters and inserting the filter into a coffee maker filter receptacle without the filter being touched by the user's hand.

It is another object of the instant invention to provide a device that could be mounted on top of a coffee maker or be a part of a coffee maker.

It is yet another object of the instant invention to provide an easy to use method of making, and using adhesive tips.

SUMMARY OF THE INVENTION

These and other objects of the instant invention are achieved by providing a housing with an abrasive coated inner wall to retain a plurality of nested cup shaped coffee filters including a cover with an adhesive tipped rod element extending downward from the center of the cover to engage and extract an uppermost filter of the plurality of nested filters, and a plunger assembly arranged around the adhesive tipped rod, slidably co-operating with the rod to detach the filter from the adhesive tipped rod and insert it into a coffee maker filter receptacle when the cap attached to the top of the plunger is depressed. The length of the plunger assembly allows the use of a skirt on the cover of sufficient length for vertical mounting of the housing and still enables the plunger to insert the filter completely into a coffee maker filter receptacle.

BRIEF DESCRIPTION OF SEVERAL VIEWS OF THE DRAWING

FIG. 1 is an cross-sectional view of the present invention.

FIG. 2 is a cross-sectional view of the cover, removed from the housing with an extracted filter attached to the adhesive tipped rod.

FIG. 3 is a cross-sectional view of the cover, with the plunger depressed and the filter detached from the adhesive tipped rod.

FIG. 4 is a cross-sectional view of an adhesive tip sandwiched between two pieces of waxed or non-adhesive paper.

DESCRIPTION OF THE PREFERRED EMBODIMENTS

Referring to FIG. 1, there is shown a combination of filter housing, extractor and a detaching inserting mechanism.

There is a filter housing 8 cylindrical in shape, having a closed end at the bottom and an open end at the top. The wall of housing is generally straight with the inner wall having a means for retaining a filter pack 26. This is accomplished by applying an abrasive coating 10, such as non-skid paint or a sandpaper type material, to a portion of the inner wall of housing 8. Housing 8 may have an indented bottom to allow flush mounting of the device using Velcro or double sided mounting tape 12. It may also have holes in the bottom for screw mounting.

There is a cover 14, of a size to encompass the outer perimeter of the housing 8, with a skirt 16, that slidably co-operates with the outer side of housing 8, and is of sufficient length to allow the device to be mounted vertically.

Attached to the under side of cover 14, in the center, is a rod 18 of sufficient length to insure that every individual filter 28 can be extracted from filter pack 26 before the underside of cover 14 bottoms out on the upper rim of housing 8. On the end of rod 18 is affixed an adhesive tip 20.

There is a plunger 22 disposed around the perimeter of rod 18 that slidably co-operates with rod 18.

The plunger 22 extends up through a hole in cover 14 and has a cap 24 attached. The bottom of plunger 18 may be cut at an angle to assist in peeling individual filter 28 off the adhesive tip 20 on rod 18.

Referring to FIG. 2, there is shown cover 14 removed from housing 8 with an individual filter 28 attached to adhesive tip 20 at the end of rod 18.

Referring to FIG. 3, there is shown cover 14 removed from housing 8 with plunger 22 depressed and the individual filter 28 detached from adhesive tip 20.

Referring to FIG. 4, there is shown a side view of how an adhesive tip 20 may be manufactured by layering an adhesive material between two pieces of waxed paper 30.

Housing 8, cover 14, with rod 18 attached, plunger 22 and cap 24 may be made of plastic, using injection molding techniques. Alternatively, the housing 8 and cover 14 may be formed using sheet metal. Rod 18 may be made of wood and be attached to cover 14 using any suitable means. Plunger 22 may be made of metal and formed to fit around rod 18.

OPERATION OF THE INVENTION

Referring to FIG. 1, a housing 8 is used to hold and store a filter pack 26 which is retained by an abrasive coating 10 on the inner wall of housing 8. An individual filter 28 can then be extracted from filter pack 26 with ease. To extract the individual filter 28, the user pushes down on the outer edge of cover 14 with the thumb and fingers which presses adhesive tip 20 on rod 18 against the individual filter 28.

Cover 14 with the individual filter 28 adhering to adhesive tip 20 on rod 18 is then lifted off housing 8 as shown in Fig.2.

The individual filter 28 is then inserted into the coffee maker receptacle and the user presses down on the cap 24 with the palm of the hand. This slides the plunger 22 down the rod 18 and detaches the individual filter 28 from the adhesive tip 20 on rod 18 as shown in FIG. 3 and inserts it firmly into the coffee maker receptacle.

To install a new adhesive tip 20 on rod 18 the user strips off the old tip, removes the waxed paper 30, from the new tip and applies it to the end of rod 18.

What I claim as my invention is:

1. A combined filter housing, extractor and inserter comprising:
   (a) a cup shaped housing means capable of holding a plurality of coffee filters therein, said housing means having an open end and a closed end;
   (b) a cover adapted to be received by and slidably co-operate with the outer wall of said housing means open end;
   (c) a central rod element extending downward from said cover, of sufficient length to reach the bottom of the housing means before the underside of said cover touches the upper rim of said housing;
   (d) an adhesive material on the bottom of said rod element to engage an uppermost coffee filter from a plurality of filters in said housing;
   (e) a plunger assembly extending above and below the cover, the lower end arranged around the adhesive tipped rod element, slidably co-operating with said rod element, the upper end terminated with a cap.

2. A combined filter housing, extractor and inserter of claim 1 wherein a portion of the inner wall of the housing means is covered with an abrasive substance for retaining a plurality of filters therein.

3. A combined filter housing, extractor and inserter of claim 1 wherein the cover includes a skirt to encompass and slidably co-operate with the open end of the housing means, said skirt being of sufficient length to allow for vertical mounting of said housing means.

4. A combined filter housing, extractor and inserter of claim 1 wherein the adhesive material is a piece of double sided mounting tape sandwiched between two pieces of waxed or non adhesive type paper, said paper being removable prior to installing said adhesive material to the tip of the central rod element.

5. A combined filter housing, extractor and inserter of claim 1 wherein the plunger assembly is of sufficient length to detach an individual filter from the adhesive tipped rod and element insert it into a coffee maker receptacle when depressed.

* * * * *